(12) United States Patent
Takata et al.

(10) Patent No.: US 8,248,800 B2
(45) Date of Patent: Aug. 21, 2012

(54) AUTOMATIC TRANSMISSION CONTROL UNIT COOLING APPARATUS

(75) Inventors: Hiroki Takata, Hekinan (JP); Naotaka Murakami, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 508 days.

(21) Appl. No.: 12/597,626

(22) PCT Filed: May 28, 2008

(86) PCT No.: PCT/JP2008/059817
§ 371 (c)(1),
(2), (4) Date: Oct. 26, 2009

(87) PCT Pub. No.: WO2008/146845
PCT Pub. Date: Dec. 4, 2008

(65) Prior Publication Data
US 2011/0228478 A1  Sep. 22, 2011

(30) Foreign Application Priority Data

May 28, 2007 (JP) ................................. 2007-140662
Sep. 28, 2007 (JP) ................................. 2007-254840

(51) Int. Cl.
*H05K 7/20* (2006.01)
(52) U.S. Cl. .............. 361/699; 361/679.53; 361/679.54; 361/715; 165/80.4; 165/104.33
(58) Field of Classification Search .............. 361/679.46, 361/679.53, 679.54, 698, 699, 715–719, 361/749–757; 165/80.3, 80.4, 104.33, 104.34, 165/185; 74/606 A, 606 R, 467, 607; 475/159, 475/123
See application file for complete search history.

(56) References Cited

U.S. PATENT DOCUMENTS

| | | | | |
|---|---|---|---|---|
| 4,271,728 A * | 6/1981 | Wakamatsu | .................... | 477/34 |
| 5,662,007 A * | 9/1997 | Starker et al. | ............... | 74/606 A |
| 5,878,630 A * | 3/1999 | Fessler et al. | ............... | 74/606 A |
| 6,530,856 B1 | 3/2003 | Kakiage | | |
| 6,688,383 B1 * | 2/2004 | Sommer et al. | ............... | 165/200 |
| 7,375,966 B2 * | 5/2008 | Murakami et al. | ............ | 361/707 |
| 7,624,660 B2 * | 12/2009 | Morise | ............................ | 74/467 |
| 7,656,674 B2 * | 2/2010 | Wetzel et al. | ................ | 361/752 |
| 7,712,395 B2 * | 5/2010 | Suzuki et al. | ............... | 74/606 R |
| 7,832,306 B2 * | 11/2010 | Suzuki et al. | ............... | 74/606 R |
| 2006/0023426 A1 * | 2/2006 | Murakami et al. | ............ | 361/715 |
| 2006/0219050 A1 | 10/2006 | Morise et al. | | |

(Continued)

FOREIGN PATENT DOCUMENTS

JP  4-175517 A  6/1992

(Continued)

*Primary Examiner* — Michail V Datskovskiy
(74) *Attorney, Agent, or Firm* — Sughrue Mion, PLLC

(57) ABSTRACT

An automatic transmission control unit cooling apparatus includes a control unit having an electronic component, installed on a substrate, for controlling the automatic transmission; a holder accommodating the substrate and within a case of the automatic transmission disposed at a position that is higher than the oil surface in the automatic transmission when the transmission is installed in a vehicle and on a side face of a valve body in the transmission case. The apparatus further includes a radiator that contacts the electronic component or the substrate in order to conduct heat generated by the electronic component. At least a part of the radiator is immersed in the oil when the transmission is installed in the vehicle.

9 Claims, 11 Drawing Sheets

U.S. PATENT DOCUMENTS

2007/0078036 A1 * 4/2007 Morise .................. 475/159

FOREIGN PATENT DOCUMENTS

| JP | 8-510317 A | 10/1996 |
| JP | 11-257483 A | 9/1999 |
| JP | 2002-012097 A | 1/2002 |
| JP | 2006-036147 A | 2/2006 |
| JP | 2006-086296 A | 3/2006 |
| JP | 2006-250321 A | 9/2006 |
| JP | 2007-100795 A | 4/2007 |

* cited by examiner

F I G . 7
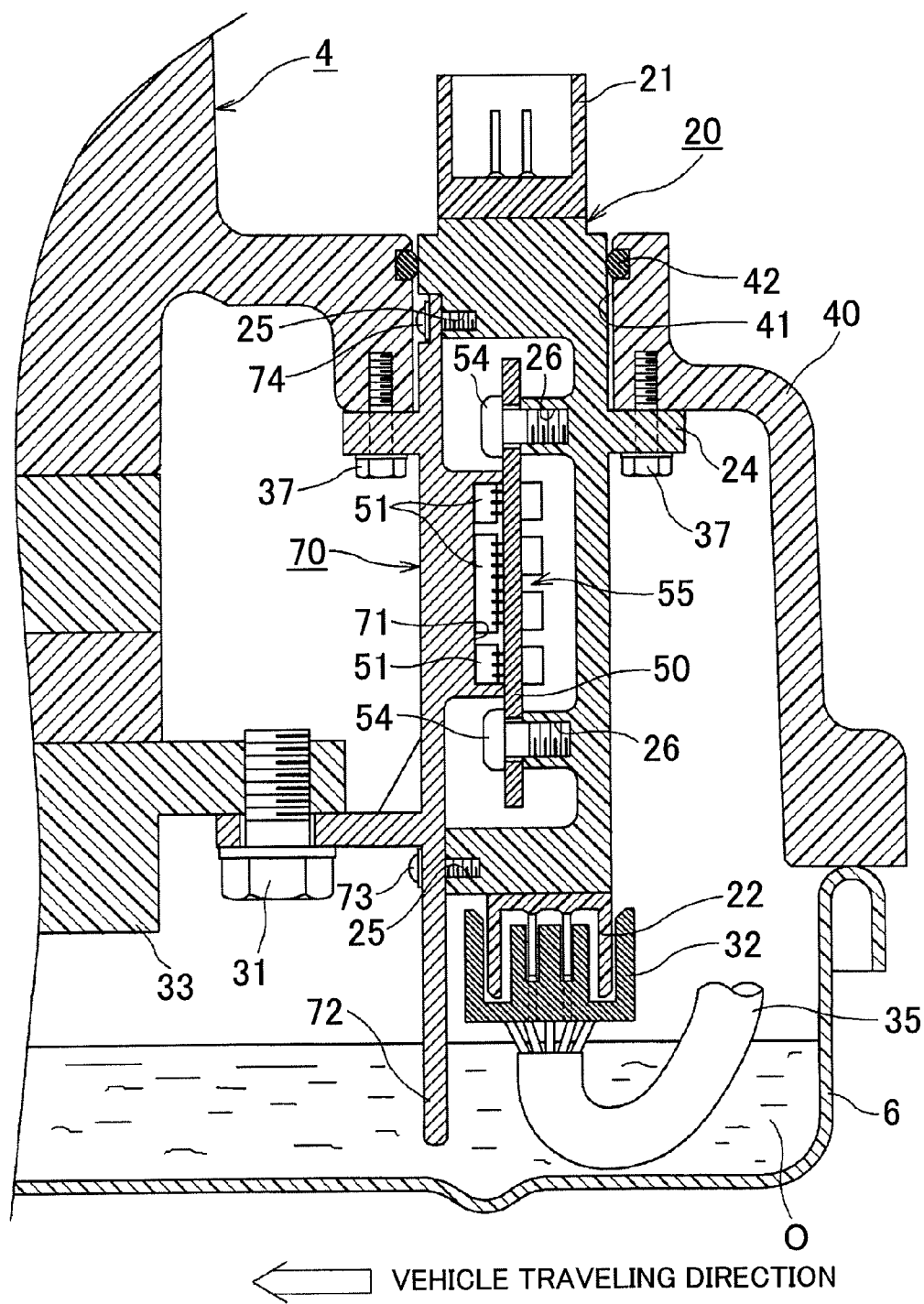
⇐ VEHICLE TRAVELING DIRECTION

VEHICLE TRAVELING DIRECTION

⇐ VEHICLE TRAVELING DIRECTION

⟵ VEHICLE TRAVELING DIRECTION

⟵ VEHICLE TRAVELING DIRECTION

AUTOMATIC TRANSMISSION CONTROL UNIT COOLING APPARATUS

INCORPORATION BY REFERENCE

The disclosure of Japanese Patent Applications No. 2007-140662 filed on May 28, 2007 and No. 2007-254840 filed on Sep. 28, 2007, including the specifications, drawings and abstracts is incorporated herein by reference in its entirety.

BACKGROUND OF THE INVENTION

The present invention relates to an automatic transmission installed with a control unit, and more particularly to an automatic transmission control unit cooling apparatus capable of suppressing a temperature increase in the control unit relative to the automatic transmission.

DESCRIPTION OF THE RELATED ART

Techniques disclosed in Japanese Patent Application Publication No. JP-A-2002-12097 and Japanese Patent Application Publication No. JP-A-2006-250321, for example, are available as conventional automatic transmission control apparatuses. Japanese Patent Application Publication No. JP-A-2002-12097 discloses an electronic control apparatus for a vehicle in which a control unit is installed on an upper portion of a valve body provided in a transmission case.

Japanese Patent Application Publication No. JP-A-2006-250321 discloses a control apparatus for an automatic transmission including an automatic transmission case having a through hole, a connector fitted into the through hole, and a control apparatus accommodated in the connector and positioned within the automatic transmission case.

SUMMARY OF THE INVENTION

However, in the technique described in Japanese Patent Application Publication No. JP-A-2002-12097, the valve body and the control unit are accommodated in stacked form, and therefore a minimum ground clearance of an automatic transmission vehicle must be lowered. Furthermore, an element or a substrate of the control unit is self-heating, but heat radiation is not taken into account.

As a structure that does not affect the minimum ground clearance of an automatic transmission vehicle, a substrate may be built into a connector case and the connector may be disposed on a side face of the valve body, as described in the technique of Japanese Patent Application Publication No. JP-A-2006-250321. However, the element and substrate are built into the resin connector case, and therefore the heat radiating ability thereof is not taken into account.

The present invention has been designed in order to solve these problems, and an object thereof is to provide an automatic transmission control unit cooling apparatus in which a control unit for controlling an automatic transmission can be accommodated in the interior of the automatic transmission, minimum ground clearance can be secured, and a temperature increase in the control unit can be suppressed.

An automatic transmission control unit cooling apparatus according to a first aspect of the present invention includes: a control unit in which an electronic component for controlling an automatic transmission is installed on a substrate; a holder which accommodates the substrate of the control unit and is disposed within a case of the automatic transmission in a higher position than an oil surface of oil accommodated in the automatic transmission when the automatic transmission is installed in a vehicle and on a side face of a valve body accommodated in the automatic transmission case; and a radiator that contacts the electronic component or the substrate so that heat generated by the electronic component is conducted thereto, at least a part of the radiator being immersed in the oil when the automatic transmission is installed in the vehicle.

Here, the control unit is a circuit in which electronic components including an IC for controlling the automatic transmission, a capacitor, a resistor, and so on are installed on a substrate. The substrate may be a flexible substrate or a hard substrate (a rigid substrate or a flexible rigid substrate).

Further, the substrate of the control unit is preferably accommodated in the holder, which is disposed in the interior of the automatic transmission case, either vertically or within a predetermined incline range when installed in a vehicle. The holder is not necessarily limited to a vertical direction as long as it is disposed in a substantially vertical direction.

The holder disposed in the automatic transmission case may include a connector on a lower portion thereof, an upper portion thereof, or both the upper and lower ends thereof when installed in a vehicle. In this embodiment, the holder is molded from a synthetic resin, but may be made of a metal such as aluminum. When the holder is molded from a synthetic resin, the connector and so on can be formed integrally therewith and lead wires can be buried therein.

Further, the radiator is connected to the electronic component installed on the substrate of the control unit or the substrate in a thermally conductive state, and therefore heat generated by the electronic component or the substrate of the control unit is transmitted by thermal radiation or thermal conduction via a package of the electronic component or via the substrate. Moreover, at least a part of the radiator, i.e. a lower end thereof, is immersed in the oil, and therefore thermal energy generated by the electronic component is transmitted to the oil. Thus, the electronic component can be cooled efficiently by the oil. The radiator is normally formed from a metal such as aluminum.

In an automatic transmission control unit cooling apparatus according to a second aspect of the present invention, a heat insulating material is interposed between the radiator and the valve body.

Here, the heat insulating material is an interposed resin or the like, but a separate member or a resin holder may also be interposed as long as thermal conduction between the radiator and the valve body is poor.

In an automatic transmission control unit cooling apparatus according to a third aspect of the present invention, the radiator is connected to the valve body via a heat radiation portion that uses the oil.

The automatic transmission control unit according to a fourth aspect of the present invention includes a connector portion connected to the electronic component disposed in the valve body, and the connector portion is provided above the oil surface.

In an automatic transmission control unit cooling apparatus according to a fifth aspect of the present invention, a surface extending substantially parallel to a traveling direction is formed to enlarge the surface area immersed in the oil.

The surface extending substantially parallel to the traveling direction is molded by pressing or the like, but may be formed by cutting and bending or connecting a fin as long as the surface extends substantially parallel to the traveling direction so that inertia of the oil can be used functionally without obstructing the oil path.

In an automatic transmission control unit cooling apparatus according to a sixth aspect of the present invention, a slit is formed in a surface that is substantially perpendicular to the traveling direction in order to secure the flow velocity of the oil.

Here, the slit is formed in a surface that is substantially perpendicular to the traveling direction to secure the flow velocity of the oil and use the inertia of the oil functionally. The size of the slit should be set taking into account the cooling efficiency, thereby ensuring that the oil that is circulated for cooling purposes performs cooling efficiently using a flow path that is not obstructed by the radiator.

In an automatic transmission control unit cooling apparatus according to a seventh aspect of the present invention, a flow path on which the oil flowing through the oil pan of the automatic transmission is not obstructed is formed.

A supply port for supplying cooled oil to the transmission side and a discharge port for oil to be cooled are normally disposed in the oil flow flowing through the oil pan of the automatic transmission. In particular, when the lower end of the radiator installed in a vehicle is immersed in the oil on a control valve side, a flow that deviates from the main flow of the oil flowing through the oil pan may form on the lower end of the radiator, leading to a reduction in cooling efficiency. Hence, in the present invention, an oil guide is formed in the oil pan to guide the oil flow to the lower end side of the radiator, and as a result, the cooling and lubricating abilities of the oil can be used efficiently.

In an automatic transmission control unit cooling apparatus according to an eighth aspect of the present invention, cooled oil circulated by a pump for cooling the oil in the automatic transmission is ejected and led into the oil pan via the radiator.

Here, the oil flow flowing through the oil pan of the automatic transmission is set such that the oil is ejected onto the radiator, and therefore the radiator can be cooled more efficiently. Note that the oil is preferably ejected onto the part of the radiator that contacts the electronic component, but as long as the oil is ejected directly onto the radiator, a heat radiation effect is obtained.

In an automatic transmission control unit cooling apparatus according to a ninth aspect of the present invention, the holder of the control unit is fixed to the automatic transmission case and the valve body.

The automatic transmission control unit cooling apparatus according to the first aspect includes the radiator for conducting heat from the electronic component or the substrate, the lower portion of which is immersed in the oil so as to release the heat, and therefore the heat generated by the electronic component can be conducted from the electronic component efficiently and favorably and then released into the oil from the lower portion of the radiator. By disposing the control unit on the side face of the valve body, minimum ground clearance is secured, and heat generated by the electronic component installed on the substrate of the control unit or the substrate can be transmitted to the radiator efficiently and released into the oil from the lower portion of the radiator even when the control unit is not immersed in the oil. As a result, an increase in the temperature of the various electronic components, or in other words an increase in the temperature of the control unit, can be suppressed.

In the automatic transmission control unit cooling apparatus according to the second aspect, a heat insulating material is interposed between the radiator and the valve body, and therefore, in addition to the effects of the first aspect, when the valve body, which is normally formed from a metal, reaches a high temperature, heat conduction from the valve body side to the control unit can be prevented.

In the automatic transmission control unit cooling apparatus according to the third aspect, the radiator is connected to the valve body via a heat radiation portion that uses the oil, and therefore, in addition to the effects of the first aspect, when the valve body, which is normally formed from a metal, reaches a high temperature, heat conduction from the valve body side to the control unit can be prevented.

In the automatic transmission control unit cooling apparatus according to the fourth aspect, the control unit includes a connector portion connected to the electronic component disposed in the valve body, and the connector portion is provided above the oil surface, and therefore, in addition to the effects of any one of the first to third aspects, a situation in which foreign matter contained in the oil adheres to the connector, causing the connector to short-circuit or the like, can be prevented.

In the automatic transmission control unit cooling apparatus according to the fifth aspect, at least the part of the radiator that is immersed in the oil is formed with a surface extending substantially parallel to the traveling direction in order to enlarge the surface area that is immersed in the oil, and therefore, in addition to the effects of any one of the first to fourth aspects, the lower portion of the radiator, which is immersed in the oil, can be used without changing the flow of the oil through the oil pan such that the conventional cooling and lubricating abilities of the automatic transmission are not reduced. Further, the surface of the radiator extending substantially parallel to the traveling direction functions as a rectifying plate in relation to the oil flow, and therefore the oil can be caused to flow smoothly and the heat radiation surface area can be enlarged.

In the automatic transmission control unit cooling apparatus according to the sixth aspect, at least the part of the radiator that is immersed in the oil is formed with a slit in the surface that is substantially perpendicular to the traveling direction in order to secure the flow velocity of the oil, and therefore, in addition to the effects of any one of the first to fifth aspects, the oil flow is not obstructed by the surface of the radiator oriented substantially perpendicular to the traveling direction of the vehicle, or in other words the direction of the oil flow. As a result, the conventional cooling and lubricating abilities of the automatic transmission are not reduced.

In the automatic transmission control unit cooling apparatus according to the seventh aspect, the part of the radiator that is immersed in the oil forms a flow path on which the oil flow flowing through the oil pan of the automatic transmission is not obstructed by the radiator, and therefore, in addition to the effects of any one of the first to sixth aspects, the conventional cooling and lubricating abilities of the automatic transmission are not reduced.

In the automatic transmission control unit cooling apparatus according to the eighth aspect, cooled oil circulated by the pump for cooling the oil in the automatic transmission is ejected onto the radiator, a part of which is immersed in the oil, and therefore, in addition to the effects of any one of the first to seventh aspects, the temperature of the control unit can be lowered with a high degree of efficiency.

In the automatic transmission control unit cooling apparatus according to the ninth aspect, the holder of the control unit is fixed to the automatic transmission case and the valve body, and therefore, in addition to the effects of any one of the first to eighth aspects, the holder can be fixed securely.

BRIEF DESCRIPTION OF THE DRAWINGS

FIG. 7 is a sectional view showing the main parts of an entire automatic transmission control unit cooling apparatus according to a second embodiment of the present invention in an attached state;

DETAILED DESCRIPTION OF THE EMBODIMENTS

Figure 1:
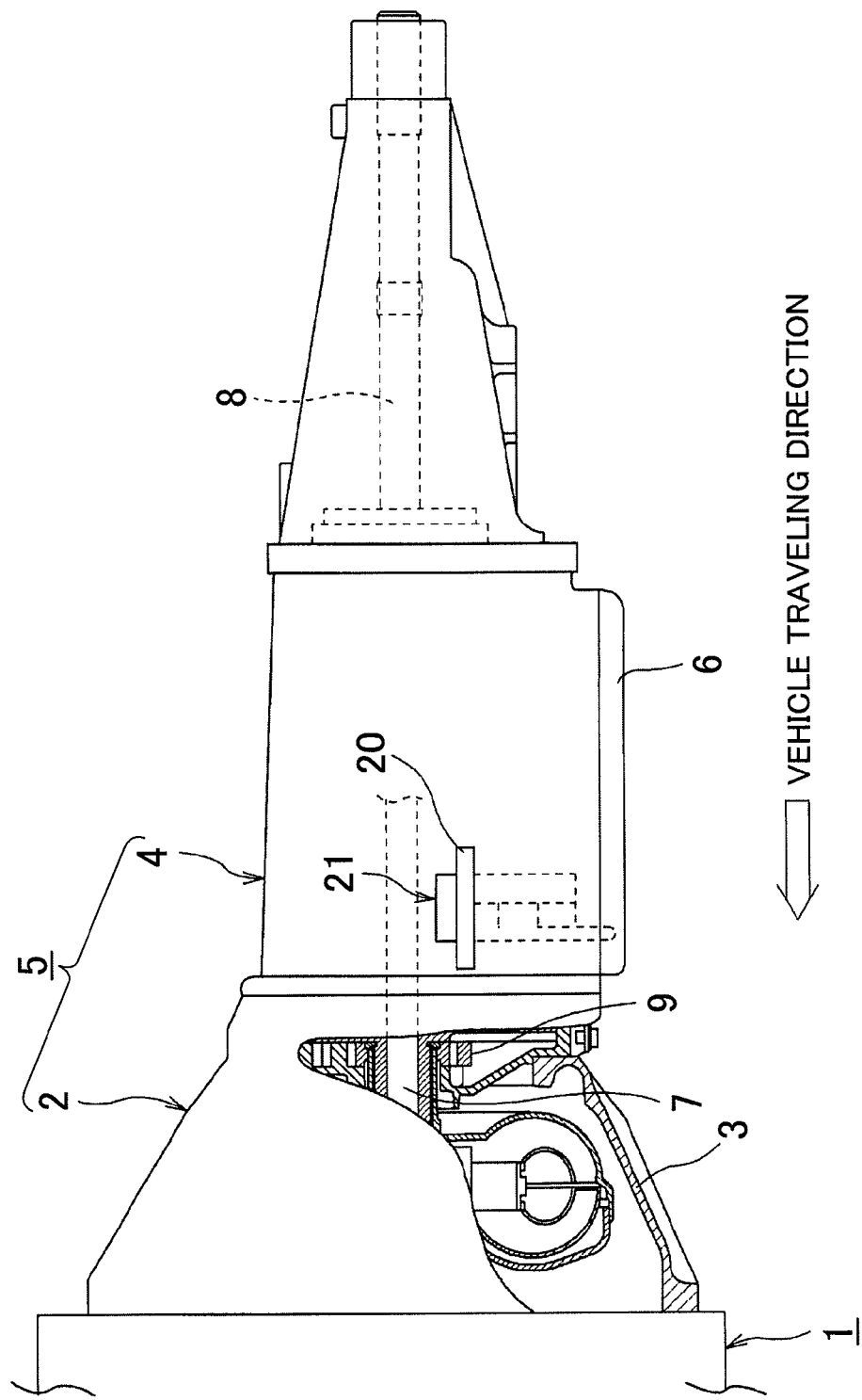
FIG. 1 is a schematic constitutional diagram showing the overall schematic constitution of an automatic transmission.

Embodiments of the present invention will be described below on the basis of the drawings. Note that in the drawings, identical symbols and numerals to those used in the first embodiment correspond to identical or corresponding functional parts in other embodiments, and therefore duplicate description has been omitted.

First Embodiment

Figure 2:
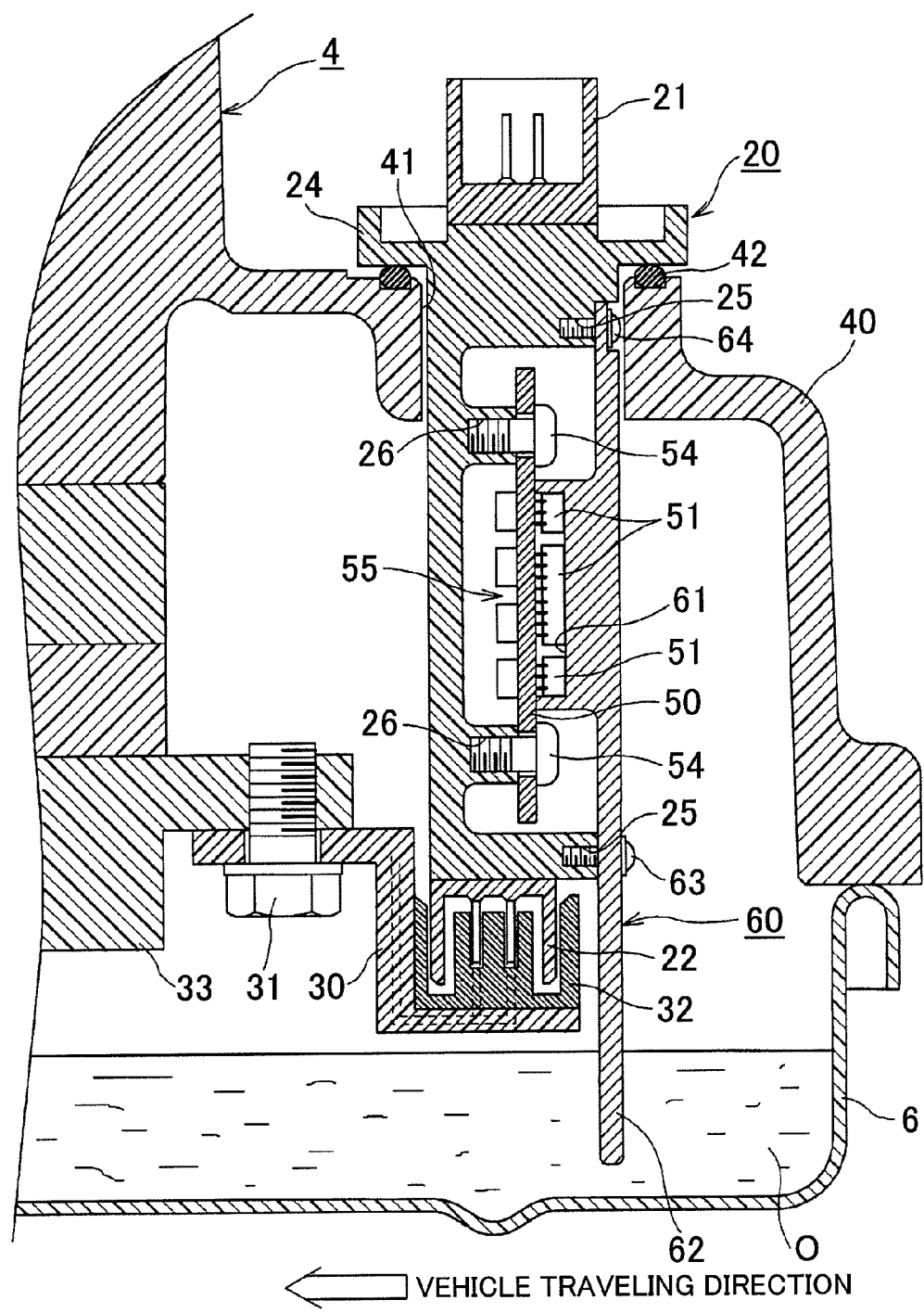
FIG. 2 is a sectional view showing the main parts of an entire automatic transmission control unit cooling apparatus according to a first embodiment of the present invention in an attached state.
Figure 3:
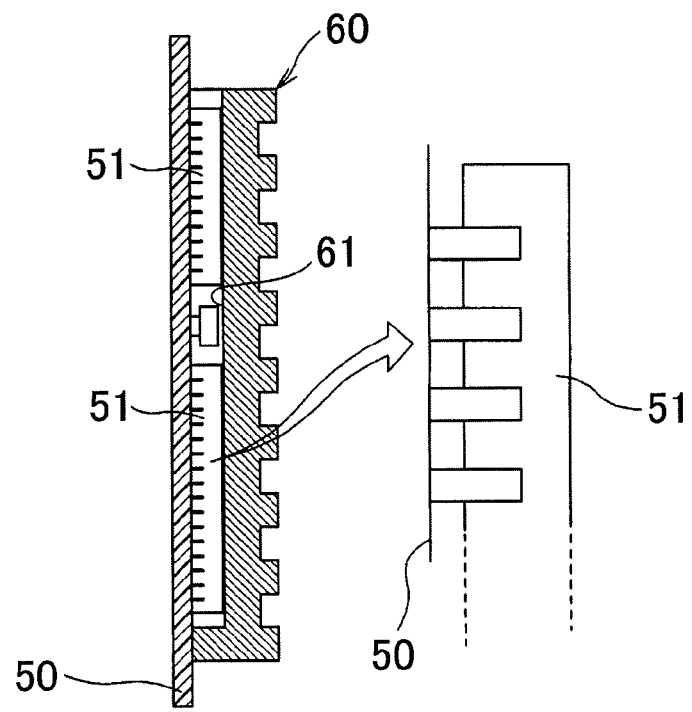
FIG. 3 is a sectional view showing another example of a relationship between an electronic component and a radiator in the automatic transmission control unit cooling apparatus according to the first embodiment of the present invention.
Figure 4:
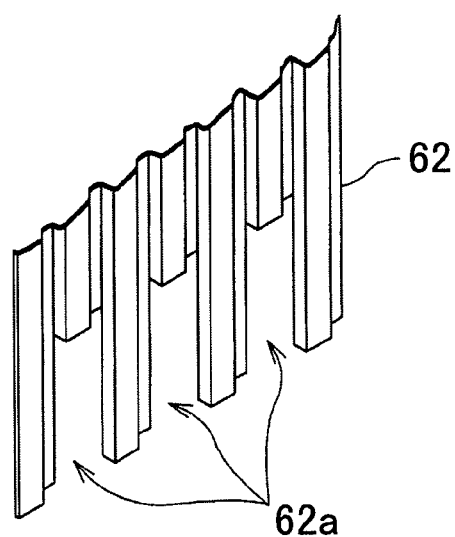
FIG. 4 is a perspective view showing the main parts of a lower portion of the radiator when the automatic transmission control unit cooling apparatus according to the first embodiment of the present invention is installed in a vehicle.
Figure 5:
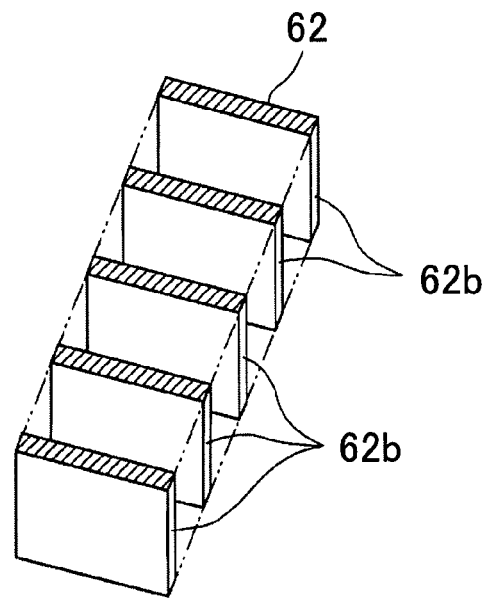
FIG. 5 is a perspective view showing a first other example of the main parts of the lower portion of the radiator when the automatic transmission control unit cooling apparatus according to the first embodiment of the present invention is installed in a vehicle.
Figure 6:
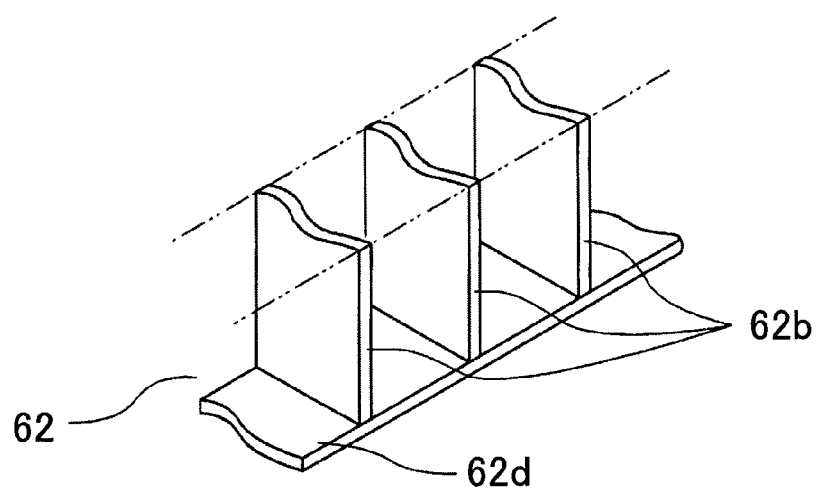
FIG. 6 is a perspective view showing a second other example of the main parts of the lower portion of the radiator when the automatic transmission control unit cooling apparatus according to the first embodiment of the present invention is installed in a vehicle.

FIG. 1 is a schematic constitutional diagram showing the overall schematic constitution of an automatic transmission. FIG. 2 is a sectional view showing the main parts of an entire automatic transmission control unit cooling apparatus according to a first embodiment of the present invention in an attached state. FIG. 3 is a sectional view showing a first other example of a relationship between an electronic component and a radiator in the automatic transmission control unit cooling apparatus according to the first embodiment of the present invention. FIG. 4 is a perspective view showing the main parts of a lower portion of the radiator when the automatic transmission control unit cooling apparatus according to the first embodiment of the present invention is installed in a vehicle. FIG. 5 is a perspective view showing a first other example of the main parts of the lower portion of the radiator when the automatic transmission control unit cooling apparatus according to the first embodiment of the present invention is installed in a vehicle. FIG. 6 is a perspective view showing a second other example of the main parts of the lower portion of the radiator when the automatic transmission control unit cooling apparatus according to the first embodiment of the present invention is installed in a vehicle.

In FIG. 1, a crankshaft serving as an output shaft of an engine 1 inputs a rotation speed and a rotation torque into a torque converter 2 accommodated in the interior of a converter housing 3. The rotation speed and rotation torque input into the torque converter 2 are then converted, whereupon a resulting output is input through an input shaft 7 of an automatic transmission 5, shifted, and output from an output shaft 8.

The automatic transmission 5 is constituted by the torque converter 2 and a speed change mechanism 4. Oil O is accommodated in a space formed by the housing 3 of the torque converter 2, the speed change mechanism 4, and an oil pan 6, and circulated through the automatic transmission 5 by an inbuilt oil pump 9.

The automatic transmission control unit cooling apparatus according to the first embodiment of the present invention is disposed on the torque converter 2 side of the speed change mechanism 4, and is structured as shown in FIG. 2.

A closed outer shell of the speed change mechanism 4 is formed by a transmission housing 40 that forms a cover and is disposed at an upper portion of the speed change mechanism 4, and the oil pan 6 that closes a lower portion opening of the transmission housing 40. A through hole 41 is formed in an upper portion of the transmission housing 40 such that a holder 20 can be freely inserted or removed from the outside. A connector 21 and a connector 22 are disposed on an upper end and a lower end of the holder 20 when the speed change mechanism 4 is installed in a vehicle. The holder 20 is made of a synthetic resin, and the connectors 21 and 22 are molded integrally therewith. Further, on the upper portion connector 21 side of the holder 20 when the speed change mechanism 4 is installed in a vehicle, a flange portion 24 is formed below the connector 21. The flange portion 24 is attached to the transmission housing 40 via an O ring 42 by a bolt, not shown in the drawing, and the flange portion 24 is disposed so that a sealing property is secured relative to the transmission housing 40. Note that when the terms "upper portion, upper end", and "lower portion, lower end" are used in the following description, it is assumed that these terms indicate an upper portion or upper end position and a lower portion or lower end position in a vehicle-installed state. The connector 21 is connected to an engine control apparatus (not shown) for controlling an engine and a neutral switch or a position sensor (not shown) for detecting a range position of the transmission, which are provided on the exterior of the transmission housing 40.

A substrate attachment portion 26 formed with a female screw is formed in at least two locations of the holder 20, and a substrate 50 is attached to the holder 20 by bolts 54. In this embodiment, it is assumed that a hard substrate (a rigid substrate or a flexible rigid substrate) is used as the substrate 50, but a flexible substrate may be used to implement the present invention. Further, an electronic component 51 is packaged on both sides of the substrate 50, which constitutes a control unit 55, but may be packaged on one side.

A radiator attachment portion 25 formed with a female screw is formed in at least two locations of the holder 20. Hence, a radiator (heat sink) 60 to be described below is held on the radiator attachment portion 25 of the holder 20 by a bolt 63 or a bolt 64.

The lower side connector 22 of the holder 20 is connected to a connector 32 attached to a holding fixture 30. In the connector 32, the holding fixture 30 is attached firmly to a valve body 33 by one or more bolts 31.

Although not shown in the drawing, the connector 32 is wired to various control devices by a cable 35 such as a lead wire built into the holding fixture 30 or a lead wire extending from the connector 32 to the outside. Further, although not shown in the drawing, the valve body 33 is fixed to the transmission housing 40 within the transmission housing 40.

The radiator 60 is formed from a metal having favorable thermal conductivity, such as aluminum or brass, and as shown in FIGS. 2 and 3, includes an inner surface 61 provided in surface contact with a surface of the electronic component 51 packaged on the substrate 50. The radiator 60 is also in surface contact with the substrate 50 so that the temperature of the substrate 50 can be transmitted to the radiator 60 easily. At this time, a thin film conductor may be provided on an outer periphery of the substrate 50 as a ground circuit so that when heat collects in the thin film conductor and is thermally conducted to the radiator 60, heat radiation can be performed efficiently.

In the first embodiment, a lower portion oil-immersed part 62 of the radiator 60 takes a flat plate shape. However, a horizontal section of the oil-immersed part 62 may be substantially C-shaped, substantially L-shaped, or substantially flat plate-shaped. To increase the surface area, the oil-immersed part 62 is formed with a curved surface, a substantially concavo-convex surface, or a substantially ribbed surface. Further, to secure the flow velocity of the oil O and the effects of inertia therein, the lower portion oil-immersed part 62 of the radiator 60 may have a surface that is flat plate-shaped to a degree that does not obstruct the flow of the oil O, or as shown in FIG. 4, a substantially ribbed surface in which slits 62a are formed relative to a surface that is substantially perpendicular to a traveling direction of the vehicle. Furthermore, as shown in FIG. 5, to increase the surface area that is immersed in the oil O, the lower portion oil-immersed part 62 of the radiator 60 is formed with surfaces 62b that extend substantially parallel to the traveling direction. Here, the surfaces 62b extending substantially parallel to the traveling direction rectify a traveling direction of the oil O, and therefore the flow velocity of the oil O is not only secured but improved. Hence, the flow of the oil O is not affected even when a large cooling surface area is secured. Note that for ease of understanding, the shapes shown in FIGS. 4 to 6 have not been chamfered, but normally, the surface of the oil-immersed part 62 is chamfered for use.

The surfaces 62b extending substantially parallel to the traveling direction shown in FIG. 5 extends in a vertical direction, but a surface 62d extending substantially parallel to the traveling direction may also be formed, as shown in FIG. 6. Here, the surface 62d extending substantially parallel to the traveling direction and the surfaces 62b extending in the vertical direction substantially parallel to the traveling direction are both used to rectify the traveling direction of the oil O, and therefore the flow velocity of the oil O is not only secured but improved. Hence, stagnation does not occur in the flow of the oil O even when a large cooling surface area is secured.

Second Embodiment

Figure 8:
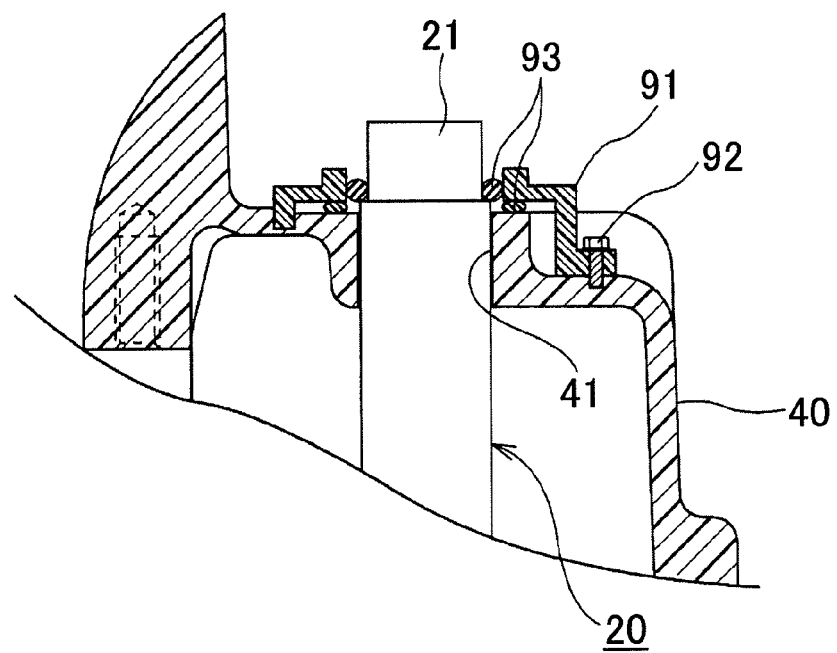
FIG. 8 is a sectional view showing the main parts of a first modified example of the automatic transmission control unit cooling apparatus according to the second embodiment of the present invention in an attached state.
Figure 9:
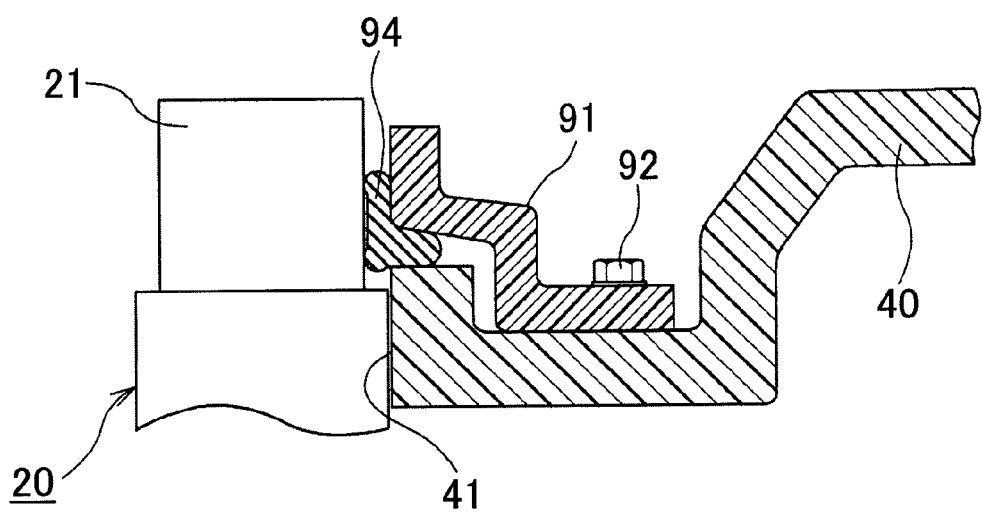
FIG. 9 is a sectional view showing the main parts of a second modified example of the automatic transmission control unit cooling apparatus according to the second embodiment of the present invention in an attached state.

FIG. 7 is a sectional view showing the main parts of an entire automatic transmission control unit cooling apparatus according to a second embodiment of the present invention when installed in a vehicle. FIG. 8 is a sectional view showing the main parts of a first modified example of the automatic transmission control unit cooling apparatus according to the second embodiment of the present invention in an attached state. FIG. 9 is a sectional view showing the main parts of a second modified example of the automatic transmission control unit cooling apparatus according to the second embodiment of the present invention in an attached state.

Similarly to the first embodiment, a radiator 70 according to this embodiment is formed from a metal having favorable thermal conductivity, such as aluminum or brass, and is either provided in surface contact with the surface of the electronic component 51 packaged on the substrate 50 or includes a surface 71 that opposes the surface of the electronic component 51 via a minute gap. The second embodiment differs from the first embodiment in that the radiator 70 is disposed in an anti-traveling direction of the vehicle relative to the holder 20 rather than the traveling direction of the vehicle relative to the holder 20. However, upon implementation of the present invention, either is possible. Further, when the substrate 50 and the radiator 70 are in surface contact, the temperature of the substrate 50 can be transmitted to the radiator 70 easily. At this time, a thin film conductor may be provided on an outer periphery of the substrate 50 as a ground circuit so that when heat collects in the thin film conductor and is thermally conducted to the radiator 70, heat radiation can be performed efficiently.

Further, the holder 20 according to this embodiment is attached from the lower side by opening the oil pan 6 such that the flange portion 24 is disposed in surface contact with a lower side of an inner surface of the transmission housing 40. Accordingly, the O ring 42 is attached so as to be sandwiched between an inner periphery of the opening of the transmission housing 40 and an outer periphery of the holder 20. The flange portion 24 is fixed to a lower surface of the transmission housing 40 by a plurality of bolts 37.

Note that the relationship between the electronic component 51 packaged on the substrate 50, the radiator 70, and an oil-immersed part 72 does not differ from the relationship between the electronic component 51 packaged on the substrate 50, the radiator 60, and the oil-immersed part 62 according to the first embodiment.

In the second embodiment, the radiator 70 is attached firmly to the valve body 33 by the one or more bolts 31. Accordingly, a material exhibiting favorable thermal conductivity, for example metal or the like, is formed between the radiator 70 and the valve body 33 so that the section extending from the radiator 70 to the valve body 33 can function as the radiator 70 and a favorable heat radiation ability can be obtained between the control unit 55 and the radiator 70.

In other words, by attaching the radiator 70 to the valve body 33 such that favorable thermal conductivity is maintained between the radiator 70 and the valve body 33, a favorable heat radiation ability can be obtained in the control unit 55 and the radiator 70 even outside of the oil-immersed part 72 on the lower portion of the radiator 70.

In the first embodiment, the holder 20 is inserted into the transmission housing 40 from above, whereas in the second embodiment, the holder 20 is inserted into the transmission housing 40 from below (the oil pan 6 side). However, upon implementation of the present invention, and in the following embodiments, either method may be selected to attach the holder 20.

In the above embodiments, the space between the transmission housing 40 and the holder 20 is sealed by the O ring 42 serving as a sealing mechanism portion, but the connector 21, which is exposed to the exterior of the transmission housing 40, is disposed on the upper end and a wire such as a cable or a lead wire is not connected thereto. Hence, external forces other than a self-load are not applied to the connector 22, and therefore the holder 20 is not caused to tilt by external forces. Accordingly, first and second modified examples of attachment, shown in FIGS. 8 and 9, may be implemented.

In FIGS. 8 and 9, a lid body 91 is disposed on an upper portion of an insertion hole 41 for inserting the holder 20 into the transmission housing 40 and fixed by tightening a predetermined number of bolts 92. At this time, a space between the insertion hole 41 of the transmission housing 40 and the lid body 91 is sealed by an O ring 93 serving as the sealing mechanism portion, and therefore the transmission housing 40 can be sealed firmly. Further, the space between the insertion hole 41 of the transmission housing 40 and the lid body 91 may be filled with packing 94. External forces do not act on the packing 94, and therefore an upright portion of the lid body 91 and the packing 94 serving as the sealing mechanism portion achieve a complete sealing property through uniform elastic force.

Third Embodiment

Figure 10:
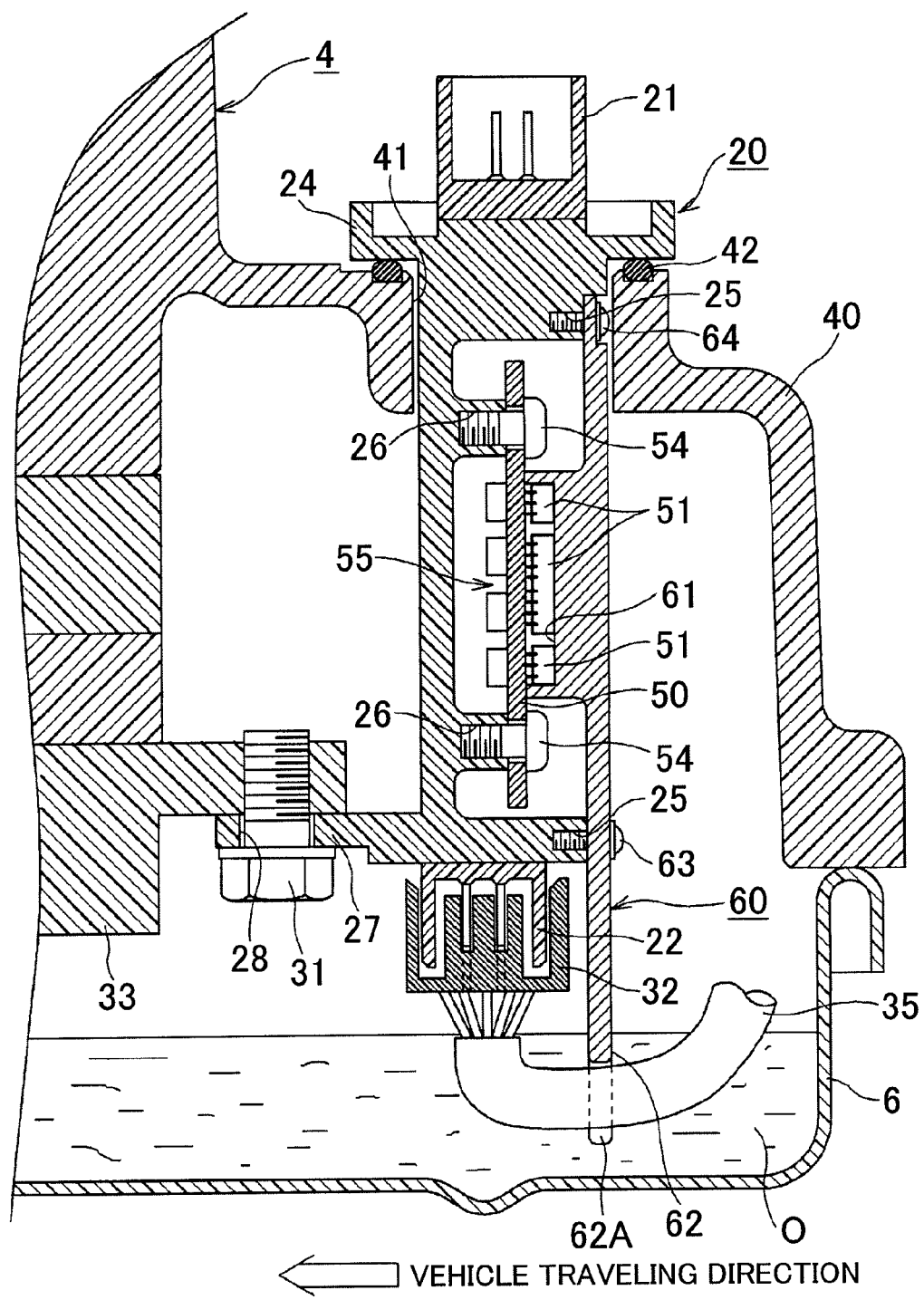
FIG. 10 is a sectional view showing the main parts of an entire automatic transmission control unit cooling apparatus according to a third embodiment of the present invention.

FIG. 10 is a sectional view showing the main parts of an entire automatic transmission control unit cooling apparatus according to a third embodiment of the present invention when installed in a vehicle.

The radiator 60 according to this embodiment is constituted similarly to the first embodiment shown in FIG. 2. The difference between this embodiment and the first embodiment is that in the first embodiment, the lower portion oil-immersed part 62 takes a flat plate shape, whereas in this embodiment, an upturned U-shaped notch 62A is formed in the vertical direction. Through the upturned U-shaped notch 62A passes the cable 35 with an end portion provided with the connector 32 connected to the connector 22. The notch 62A improves the flow velocity such that even when a large cooling surface area is secured, stagnation does not occur in the flow of the oil O.

Further, a holding portion 27 is formed on the back of the holder 20, and the holding portion 27 is attached firmly to the valve body 33 by the one or more bolts 31, which are inserted into an attachment hole 28 provided therein.

Here, the holding portion 27 is formed from synthetic resin as the holder 20, which means that the valve body 33 and the substrate 50 constituting the control unit 55 are disposed via a heat insulating material extending from the radiator 60 to the valve body 33. Hence, the automatic transmission control unit cooling apparatus can be constructed without taking into account temperature increases in the valve body 33.

Fourth Embodiment

Figure 11:
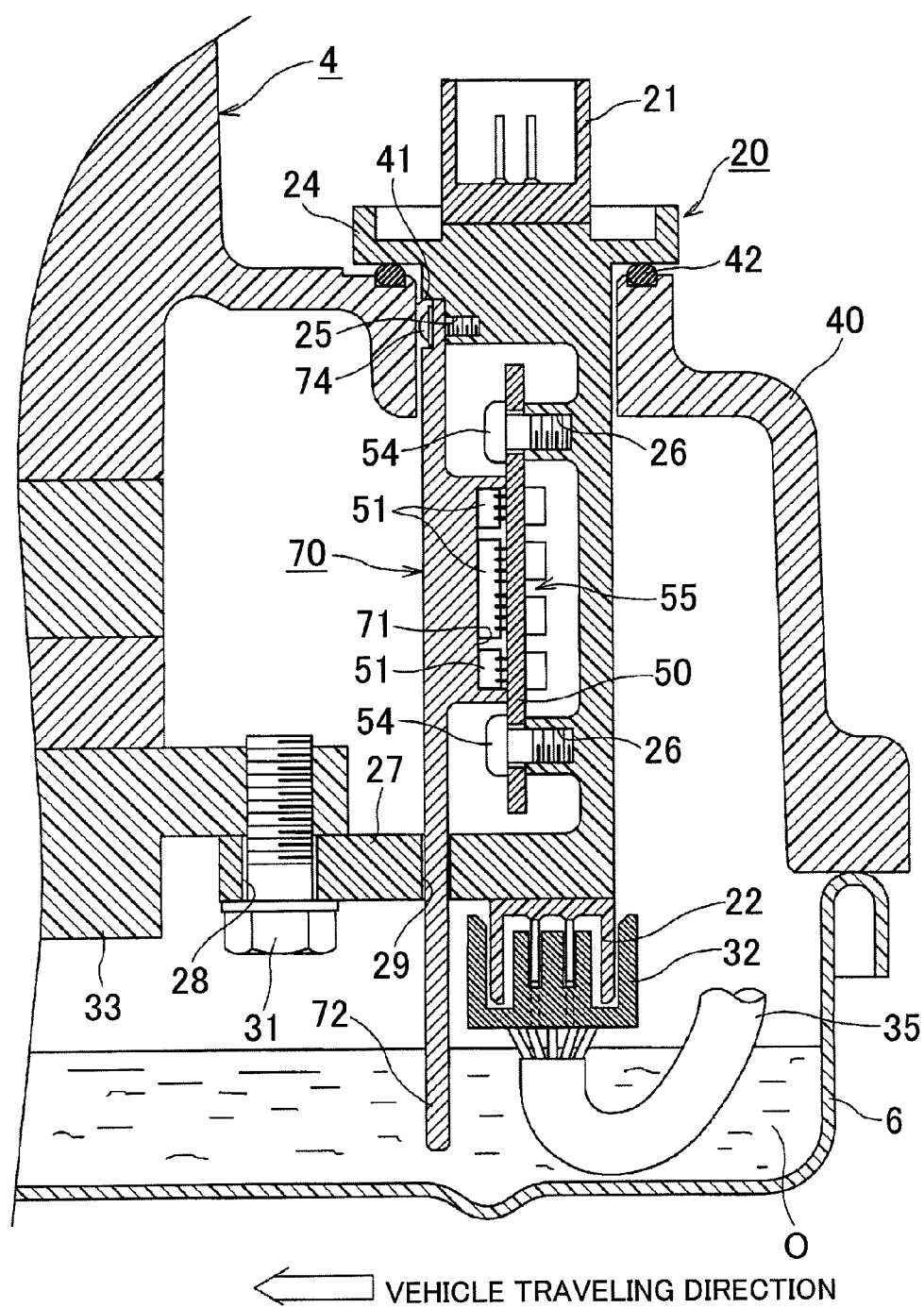
FIG. 11 is a sectional view showing the main parts of an entire automatic transmission control unit cooling apparatus according to a fourth embodiment of the present invention.

FIG. 11 is a sectional view showing the main parts of an entire automatic transmission control unit cooling apparatus according to a fourth embodiment of the present invention when installed in a vehicle.

The radiator 70 according to this embodiment is constituted similarly to that of the second embodiment shown in FIG. 7. The difference between this embodiment and the second embodiment is that the holding portion 27 is formed on the valve body 33 side of the holder 20, and the holding portion 27 is attached firmly to the valve body 33 by the one or more bolts 31, which are inserted into an attachment hole 28 provided therein.

Further, a through hole 29 penetrating the oil-immersed part 72 of the radiator 70 is drilled into the holding portion 27. The through hole 29 is formed such that there is substantially no backlash when it penetrates the oil-immersed part 72 of the radiator 70.

Here, the holding portion 27 is formed from synthetic resin as the holder 20, which means that the valve body 33 and the substrate 50 constituting the control unit 55 are attached via a heat insulating material extending from the radiator 70 to the valve body 33. Hence, the automatic transmission control unit cooling apparatus can be constructed without taking into account temperature increases in the valve body 33.

More specifically, the oil-immersed radiator 60, 70 of the automatic transmission control unit cooling apparatus according to the third and fourth embodiments is attached to the valve body 33 via a heat insulating material extending from the radiator 60, 70 to the valve body 33. Here, thermal insulation between the radiator 60, 70 and the valve body 33 is achieved by interposing a conductor exhibiting poor thermal conductivity such that thermal conductivity between the two components is poor. In the valve body 33, a high pressure such as a line pressure is generated by a solenoid valve, a control valve, or another valve, not shown in the drawing, and therefore the temperature of the oil in the valve body 33 increases, leading to an increase in the temperature of the metal valve body 33. Oil returning from a cooler flows into the oil pan, and therefore the temperature of the oil in the oil pan 6 is lower than the temperature of the oil in the valve body 33. Hence, heat traveling from the valve body to the radiator 60, 70 is blocked by the heat insulating material and heat can be released from the radiator 60, 70 by the oil O.

Fifth Embodiment

Figure 12:
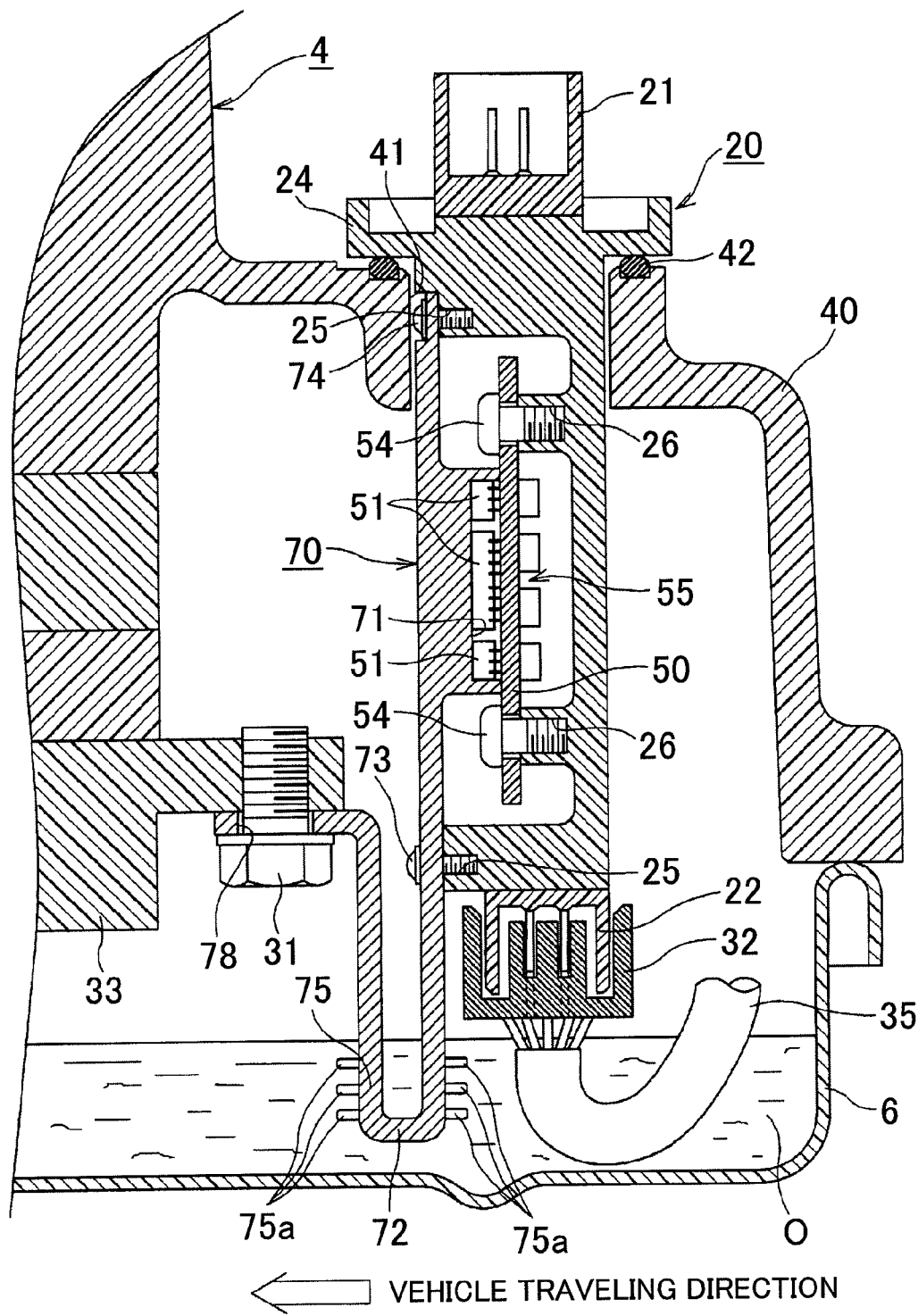
FIG. 12 is a sectional view showing the main parts of an entire automatic transmission control unit cooling apparatus according to a fifth embodiment of the present invention.

FIG. 12 is a sectional view showing the main parts of an entire automatic transmission control unit cooling apparatus according to a fifth embodiment of the present invention when installed in a vehicle.

The radiator 70 according to this embodiment is constituted similarly to that of the second embodiment. This embodiment differs from the second embodiment in that the oil-immersed part 72 of the radiator 70 does not exist on the end portion of the radiator 70, and the end portion of the oil-immersed part 72 is attached firmly to the valve body 33 by the one or more bolts 31 using an attachment hole 78 provided therein.

More specifically, the oil-immersed part 72 on the lower portion of the radiator 70 is formed with a substantially U-shaped intermediate portion 75, the oil-immersed part 72 of the radiator 70 is immersed in the oil O, and a plurality of fins 75a is provided on the intermediate portion 75.

By providing the intermediate portion 75 with the plurality of fins 75a, heat generated in the substrate 50 constituting the control unit 55 is released by the oil-immersed part 72 of the radiator 70 on the substrate 50 side in accordance with cooling ability of the oil O. Similarly, heat conducted from the valve body 33 side is released by the oil-immersed part 72 to cool the valve body 33.

Here, the intermediate portion 75 of the radiator 70 is provided with the plurality of fins 75a, and therefore the heat of the radiator 70, from the valve body 33 and the substrate 50 constituting the control unit 55, flows toward and is released by the oil-immersed part 72. Here also, thermal insulation is provided between the radiator 70 and the valve body 33, and therefore increases in the temperature of the valve body 33 need not be taken into account.

In other words, the radiator 70 immersed in oil of the automatic transmission control unit cooling apparatus according to the fifth embodiment is attached to the valve body 33 such that thermal insulation is provided between the radiator 70 and the valve body 33.

Sixth Embodiment

In the above embodiments, the flow of the oil O is not a featured element. However, the flow of the oil O may be modified actively. A sixth embodiment is an example thereof.

Figure 13:
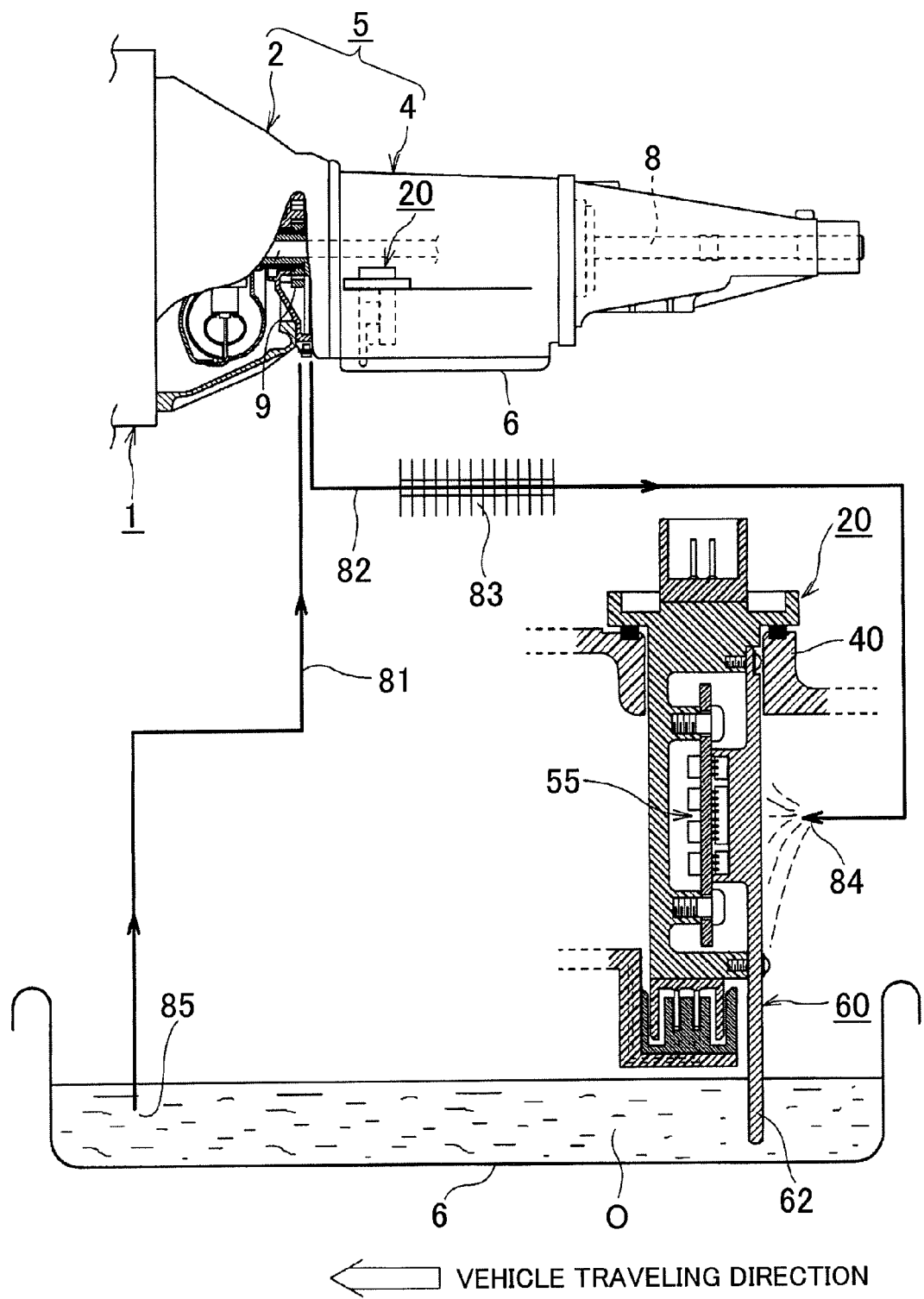
FIG. 13 is a sectional view showing the main parts of an entire automatic transmission control unit cooling apparatus according to a sixth embodiment of the present invention.

FIG. 13 is a sectional view showing the main parts of an entire automatic transmission control unit cooling apparatus according to the sixth embodiment of the present invention.

The oil pump 9 incorporated into the automatic transmission 5 has a well-known structure. The oil pump 9 may be structured such that the oil O is suctioned through a suction pipe 81 from a suction port 85 provided in a lower portion of the oil pan 6 and discharged through a discharge pipe 82. The oil O passes through a cooling fin 83, whereby the temperature of the oil O is reduced, and then the reduced-temperature oil O is ejected onto the radiator 60, 70 through an ejection port 84 disposed in the transmission housing 40 or the oil pan 6. In this embodiment, the oil pump 9 may be used similarly in both the radiator 60 and the radiator 70.

More specifically, in the automatic transmission control unit cooling apparatus according to this embodiment, the cooled oil O circulated by the oil pump 9 for cooling the oil O in the automatic transmission 5 is ejected onto the radiator 60, 70 and then led into the oil pan 6 via the radiator 60, 70. The flow of the oil O flowing through the oil pan 6 of the automatic transmission 5 is normally set such that the oil O to be cooled is suctioned through the suction port 85 of the suction pipe 81 on the automatic transmission 5 side, whereupon the cooled oil O discharged through the discharge pipe 82 is ejected onto the radiator 60, 70 through the ejection port 84. Thus, the radiator 60, 70 can be cooled efficiently. The oil O is preferably ejected onto a position of the electronic component 51 of the radiator 60, 70, but as long as the oil O is ultimately ejected directly onto the radiator 60, 70, a satisfactory effect is obtained through thermal conduction. The oil-immersed part 62, 72 on the lower portion of the radiator 60, 70 is not a required component.

Note that in this embodiment, the ejection direction of the oil O matches the traveling direction of the vehicle, but may be opposite thereto. In other words, the ejection direction of the oil O may match a reversing direction of the vehicle.

Seventh Embodiment

Figure 14:
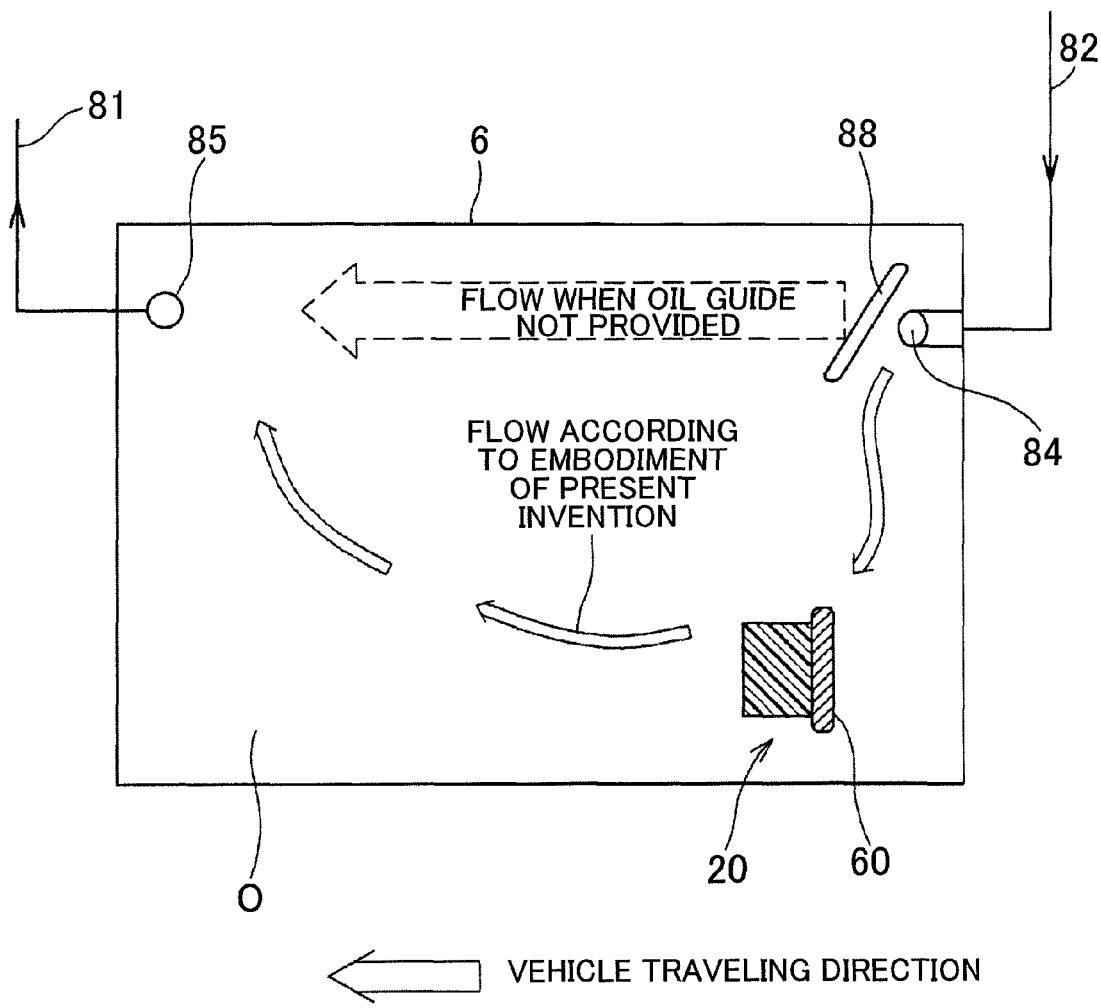
FIG. 14 is a plan view showing the entirety of a plane of an oil pan provided in an automatic transmission control unit cooling apparatus according to a seventh embodiment of the present invention.

FIG. 14 is a plan view showing the entirety of a plane of an oil pan provided in an automatic transmission control unit cooling apparatus according to a seventh embodiment of the present invention.

In the oil pump 9 incorporated into the automatic transmission 5, the oil O is suctioned through the suction pipe 81 from the suction port 85 on the lower portion of the oil pan 6 and then passed through the cooling fin 83, whereby the temperature of the oil O is reduced. The reduced-temperature oil O is then returned to the transmission housing 40 or the oil pan 6 through the discharge pipe 82.

However, when a planar surface area of the oil pan 6 is wide and the suction port 85 of the suction pipe 81 and the ejection port 84 of the discharge pipe 82 are provided on the same side of the oil pan 6, the oil O flows toward the suction port 85 from the ejection port 84. In this case, the oil-immersed part 62, 72 on the lower portion of the radiator 60, 70 may obstruct the flow of the oil O.

Hence, in this embodiment, a flat plate-shaped or press-molded oil guide 88 having a predetermined height, as shown in FIG. 14, is provided so that the oil O in the oil pan 6 flows without obstruction. More specifically, the oil guide 88 is used to reduce the amount of oil O flowing directly to the suction port 85 side of the suction pipe 81 and form a flow of oil O on the opposite side of the oil pan 6, on which the suction port 85 of the suction pipe 81 and the ejection port 84 of the discharge pipe 82 are formed. As a result, the flow of the oil O is not obstructed even when the oil-immersed part 62, 72 on the lower portion of the radiator 60, 70 is positioned within the flow of the oil O, and therefore the heat radiation effect generated by the oil-immersed part 62, 72 of the radiator 60, 70 is not reduced.

Note that this embodiment may be used in a similar manner in the embodiments described above.

Hence, in the automatic transmission control unit cooling apparatus according to this embodiment, the radiator 60, 70 immersed in the oil O is constituted such that a flow path on which the oil flowing through the oil pan 6 of the automatic transmission 5 is not obstructed by the oil-immersed part 62, 72 of the radiator 60, 70 is formed by the oil guide 88, and therefore an increase in the temperature of the control unit 55, which is not disposed within the oil in the oil pan 6, can be suppressed without reducing the conventional cooling and lubricating abilities of the automatic transmission 5.

The radiator 60, 70 of the automatic transmission control unit cooling apparatuses according to the first to seventh embodiments has a substantially C-shaped, substantially L-shaped, or substantially flat plate-shaped horizontal section, and is formed with a curved surface, a substantially concavo-convex surface, or a substantially ribbed surface to increase the surface area thereof.

Further, the oil-immersed part 62, 72 on the lower portion of the radiator 60, 70 may be formed in a flat plate shape that does not obstruct the flow of the oil O, or as shown in FIGS. 4 to 6, a flat plate shape in which the slit 62a is formed in a surface that is substantially perpendicular to the traveling direction of the vehicle in order to secure the flow velocity of the oil O.

Further, as shown in FIG. 5, the oil-immersed part 62, 72 on the lower portion of the radiator 60, 70 is formed with the surfaces 62b that extend substantially parallel to the traveling direction to enlarge the surface area that is immersed in the oil. Here, the surfaces 62b extending substantially parallel to the traveling direction rectify the traveling direction of the oil O, and therefore the flow velocity of the oil O is not only secured but improved. Hence, the flow of the oil O is not affected by the oil-immersed part 62, 72 even when a large cooling surface area is secured.

Further, as shown in FIG. 6, the surface 62d extending substantially parallel to the traveling direction may also be formed in the horizontal direction of the oil-immersed part 62, 72 on the lower portion of the radiator 60, 70. Here, the surface 62d extending substantially parallel to the traveling direction in the horizontal direction and the surfaces 62b extending in the vertical direction substantially parallel to the traveling direction are both used to rectify the traveling direction of the oil O, and therefore the flow velocity of the oil O is not only secured but improved. Hence, the flow of the oil O is not affected even when a large cooling surface area is secured. Moreover, when the vehicle accelerates or decelerates rapidly, cooling can be performed efficiently due to motion based on the inertia of the stored oil O.

Hence, the automatic transmission control unit cooling apparatus according to the above embodiments includes: the control unit 55 in which the electronic component 51 for controlling the automatic transmission 5 is installed on the substrate 50; the holder 20 which accommodates the substrate 50 of the control unit 55 and is inserted into a higher position than an upper surface of the oil O accommodated in the automatic transmission 5 when installed in the vehicle and on a side face of the valve body 33 accommodated in the interior of the automatic transmission housing 40; and the radiator 60, 70 which is fixed to the holder 20 so that heat from the electronic component 51 is conducted favorably, extends toward the oil surface when the automatic transmission 5 is installed in the vehicle, and includes the oil-immersed part 62, 72 immersed in the oil O.

The automatic transmission control unit cooling apparatus according to the above embodiments includes the radiator 60, 70 to which the control unit 55 installed with the electronic component 51 for controlling the automatic transmission 5 is attached in a substantially vertical direction, in which the connector 22 is provided on at least a lower portion thereof, which is fixed to the holder 20 inserted into the interior of the automatic transmission housing 40 from above, and which conducts and/or radiates heat from the electronic component 51 favorably and releases the heat into the oil O from the lower portion thereof. Therefore, heat generated by the electronic component 51 is transmitted to the radiator 60, 70 and conducted efficiently such that the heat can be released into the oil from the lower portion of the radiator 60, 70.

Hence, even when the control unit 55 is not attached within the oil in the oil pan 6 and even when the load of the control unit 55 is large, the heat generated by the electronic component 51 installed in the control unit 55 can be transmitted to the radiator 60, 70 efficiently and released into the oil from the lower portion of the radiator 60, 70. As a result, an increase in the temperature of the various electronic components, or in other words an increase in the temperature of the control unit 55, can be suppressed.

The automatic transmission control unit cooling apparatus according to the first to seventh embodiments includes: the control unit 55 in which the electronic component 51 is installed on the substrate 50 for controlling the automatic transmission 5; the holder 20 to which the control unit 55 is attached and which is inserted into the interior of the automatic transmission housing 40 from above; and the radiator 60, 70 which is fixed to the holder 20 so that heat from the electronic component 51 is conducted favorably, and in which the oil-immersed part 62, 72 provided on a lower portion thereof is immersed in the oil O.

The radiator 60, 70 immersed in the oil O is formed with a surface extending substantially parallel to the traveling direction in order to enlarge the surface area thereof that is immersed in the oil O, and therefore the lower portion of the radiator 60, 70 immersed in the oil O can be used without changing the flow of the oil O in the oil pan 6. As a result, the conventional cooling and lubricating abilities of the automatic transmission 5 are not reduced. Further, the surface of the radiator 60, 70 extending substantially parallel to the traveling direction functions as a rectifying plate in relation to the flow of the oil O, and therefore the oil O can be caused to flow smoothly and the heat radiation surface area can be enlarged. Moreover, when the vehicle accelerates or decelerates rapidly, cooling can be performed efficiently due to motion based on the inertia of the stored oil O.

In the oil-immersed part 62, 72 of the radiator 60, 70, in which the slit 62a is formed in the surface that is substantially perpendicular to the traveling direction of the vehicle in order to secure the flow velocity of the oil O, the flow of the oil O is not obstructed by the surface of the radiator 60, 70, which is disposed substantially perpendicular to the traveling direction of the vehicle, or in other words the flow direction of the oil O. Therefore, the conventional cooling and lubricating abilities of the automatic transmission 5 are not reduced.

The oil-immersed part 62, 72 of the radiator 60, 70 forms a flow path on which the oil flowing through the oil pan 6 of the automatic transmission 5 is not obstructed by the radiator 60, 70, and therefore an increase in the temperature of the control unit 55, which is not disposed in the oil, can be suppressed without reducing the conventional cooling and lubricating abilities of the automatic transmission 5.

Further, the radiator 60, 70, onto which the cooled oil O circulated by the pump 9 for cooling the oil O in the automatic transmission 5 is ejected, can lower the temperature of the control unit 55 with a high degree of efficiency.

In the first and third embodiments, the holder 20 is disposed on the torque converter 2 side of the oil pan 6 in the automatic transmission 5. In other words, the control unit 55 is disposed on the torque converter 2 side. In the second, fourth and fifth embodiments, the holder 20 is disposed on the opposite side to the torque converter 2, or in other words the control unit 55 is disposed on the opposite side to the torque converter 2. However, upon implementation of the present invention, the control unit 55 may be disposed on either the torque converter 2 side of the oil pan 6 in the automatic transmission 5 or the opposite side.

In the first to seventh embodiments, the radiator 60, 70 is disposed substantially perpendicular to the traveling direction of the vehicle in order to enlarge the surface area thereof that is immersed in the oil, but upon implementation of the present invention, the radiator 60, 70 may be disposed at a predetermined angle of 30 degrees, 45 degrees, 60 degrees, or the like, depending on the form of the oil-immersed part 62, 72. Needless to say, this applies similarly to the upper portion of the oil-immersed part 62, 72.

In other words, the radiator 60, 70 may be set at a predetermined angle relative to the traveling direction of the vehicle. However, when the radiator 60, 70 is disposed substantially perpendicular to the traveling direction of the vehicle, a collision can be generated between the oil O and the radiator 60, 70 by an inertial moment of the oil O, and therefore cooling can be performed efficiently.

Further, in the first to seventh embodiments, the control unit 55 is fixed to the holder 20, and the radiator 60, 70 is fixed to the holder 20 while contacting the control unit 55. However, the radiator 60, 70 may be fixed to the control unit 55 or fixed to both the control unit 55 and the holder 20.

The invention claimed is:

1. An automatic transmission control unit cooling apparatus characterized by comprising:
   a control unit in which an electronic component for controlling an automatic transmission is installed on a substrate;
   a holder which accommodates the substrate of the control unit and is disposed within a case of the automatic transmission in a higher position than an oil surface of oil accommodated in the automatic transmission when the automatic transmission is installed in a vehicle and on a side face of a valve body accommodated in the automatic transmission case; and a radiator that contacts the electronic component or the substrate so that heat generated by the electronic component is conducted thereto, at least a part of the radiator being immersed in the oil when the automatic transmission is installed in the vehicle.

2. The automatic transmission control unit cooling apparatus according to claim 1, wherein a heat insulating material is interposed between the radiator and the valve body.

3. The automatic transmission control unit cooling apparatus according to claim 1, wherein the radiator is connected to the valve body via a heat radiation portion that uses the oil.

4. The automatic transmission control unit cooling apparatus of claim 1, wherein the control unit includes a connector portion connected to the electronic component disposed in the valve body, and the connector portion is provided above the oil surface.

5. The automatic transmission control unit cooling apparatus of claim 1, wherein the part of the radiator that is immersed in the oil is formed with a surface extending substantially parallel to a traveling direction of the oil in an oil pan.

6. The automatic transmission control unit cooling apparatus according to claim 1, wherein in the part of the radiator that is immersed in the oil, a slit is formed in a surface that is substantially perpendicular to the traveling direction of the oil in the oil pan.

7. The automatic transmission control unit cooling apparatus according to claim 1, wherein the radiator forms a flow path on which the oil flowing through the oil pan of the automatic transmission is not obstructed by the part of the radiator that is immersed in the oil.

8. The automatic transmission control unit cooling apparatus according to claim 1, wherein cooled oil circulated by a pump for cooling the oil in the automatic transmission is ejected onto the radiator and the oil is led into the oil pan via the radiator.

9. The automatic transmission control unit cooling apparatus according to claim 1, wherein the holder of the control unit is fixed to the automatic transmission case and the valve body.

* * * * *